June 28, 1938. E. STUBBS 2,121,840
METHOD OF GEAR GENERATION AND APPARATUS FOR PERFORMING SUCH METHOD
Filed June 26, 1935
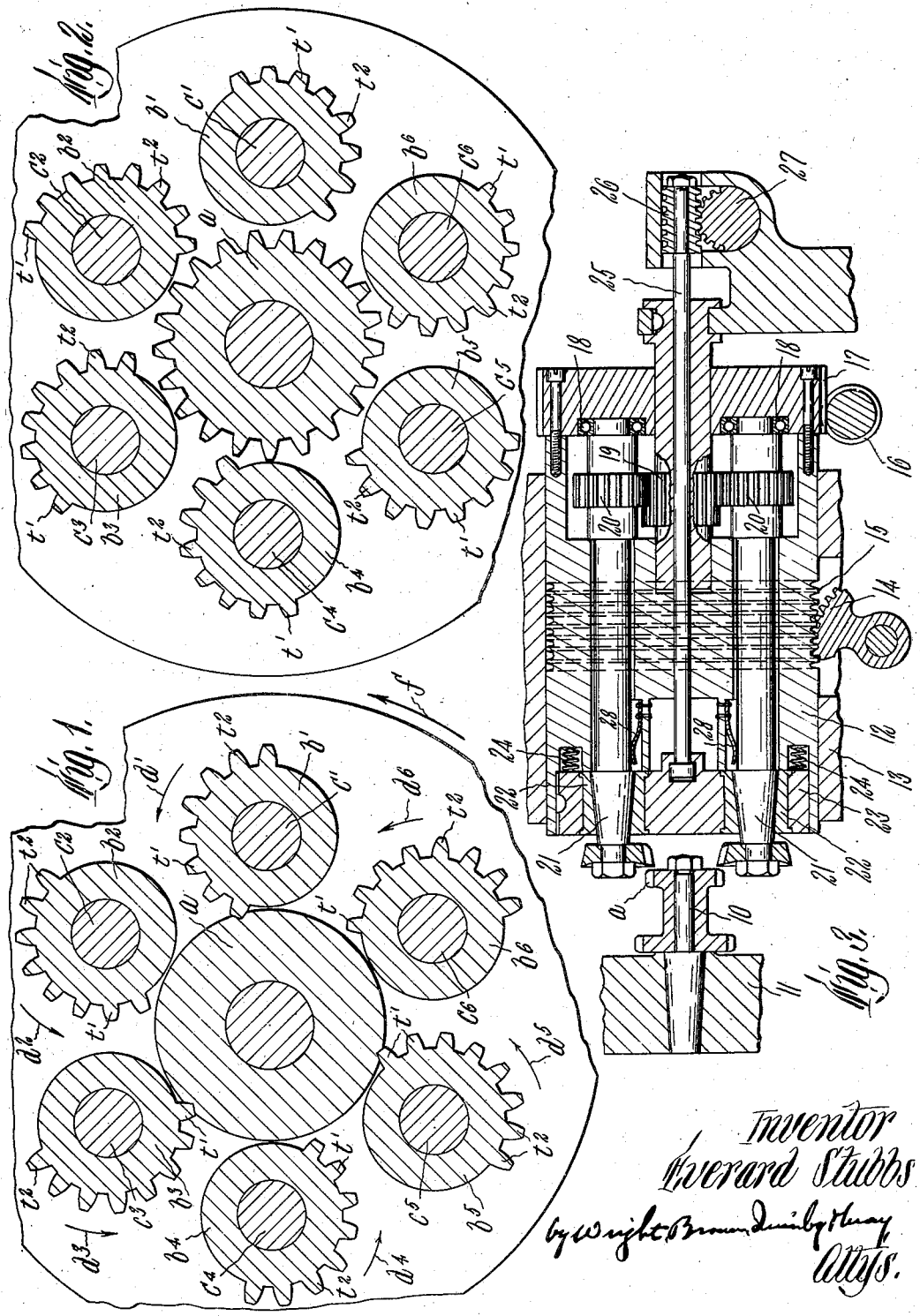

Patented June 28, 1938

2,121,840

UNITED STATES PATENT OFFICE 2,121,840

METHOD OF GEAR GENERATION AND APPARATUS FOR PERFORMING SUCH METHOD

Everard Stubbs, Springfield, Vt., assignor to The Fellows Gear Shaper Company, Springfield, Vt., a corporation of Vermont Application June 26, 1935, Serial No. 28,435

20 Claims. (Cl. 90—9)

The present invention relates to the generation of gears by relative reciprocation between the work piece, (a gear blank) and cutters of the gear shaper type, in the direction of the axes of the cutters, together with relative rotation between such cutters and the work piece in the manner of intermeshing gears. The cutters herein referred to as of the gear shaper type have teeth arranged similarly to the teeth of a gear conjugate to the teeth to be cut in the work, but differing from gear teeth in that they have cutting edges at one end and their side faces are inclined convergently away from the cutting end to provide side clearance in the cutting action.

The object of this invention is to effect rapid generation of gears, and to do this with a most compact assemblage of cutter and work spindles and with cutters of the dimensions and other characteristics substantially conforming with those used in the practice which has long been standard heretofore. In carrying out this object I provide a number of interrupted or incomplete cutters distributed around the location of the work piece in positions such as to permit all of them to act simultaneously at different points on the work piece, whereby each cutter generates a fraction of the whole number of teeth, but all of them together generate a complete gear with teeth correctly spaced from one another about its entire pitch circle. Either complete gears or gear segments may be made by this method. The principle is the same in either case. Between such cutters and the work are effected relative movements of reciprocation in the direction of the cutter axes and relative movements of rotation about their respective axes in the manner of conjugate gears running in mesh with one another; and such rotational movements may be imparted to both the cutters and the work piece simultaneously, or to the cutters only compounded of rotation about their own axes and revolution about the axis of the work, in the manner of planet pinions.

Mechanisms for effecting these movements, and for effecting relief between the cutter teeth and the work to avoid rub on the noncutting (return) strokes have been developed as part of an organized machine for practising this method. Such machine and mechanisms, however, beyond the generic formulation of means hereinafter referred to, are not of my invention. What I have invented is the method of, and the principles of means for, acting on a single work piece by a plurality of cutters simultaneously, with generation by each cutter of a fraction only of the whole number of teeth to be cut and the correlation of the cutters with one another so that their joint effort produces a complete series of equally spaced teeth. This principle may be combined, and is so shown in the present illustration, with two or more series of teeth or cutting units, of which the second set, and the following sets if more than two are provided, are designed to cut deeper and/or wider spaces than those cut by the preceding series; the cutters being so correlated that a subsequent series of teeth on each cutter enlarges the spaces cut by the primary, or other preceding, tooth series of the preceding cutter.

The drawing furnished herewith illustrates in a diagrammatic manner the steps and operations in which this method is comprised, and the principles of a machine for performing the method.

In this drawing,—

Fig. 1 is a view of the cutters and work at the commencement of the cutting cycle;

Fig. 2 is a similar view but showing the cutters and work after the cycle has been completed;

Fig. 3 is a diagrammatic view showing in section the principles of mechanisms suitable for giving reciprocating and planetary movements to such cutters relatively to a stationary work piece.

Referring to Figs. 1 and 2, the work piece, a gear blank, is designated $a$, and the cutters are all designated $b$, but are distinguished from one another by exponents $1$, $2$, $3$, etc. They are all alike, and each is provided with teeth throughout only a fraction of its circumference. The characteristics of such teeth, as to cutting edges and side clearance, correspond substantially to those set forth in the Fellows Patent 676,226, June 11, 1901. In other words the cutters are of the well known gear shaper cutter type.

In this illustration each cutter has two series of teeth designated respectively $t'$ and $t^2$, of which those of the first series constitute one cutting unit and are designed to generate spaces or grooves in the work of less width and depth than the prescribed final dimensions, while the teeth $t^2$, longer and wider than the teeth $t'$ constitute the second unit and are designed to cut spaces of the full prescribed depth and width, thus reducing the width and increasing the length of the incomplete teeth first generated. So far as the basic principles of the method are concerned, each of said units is a complete cutter. That is, the teeth $t'$ may be of such form and dimensions as to cut spaces and generate teeth of the prescribed final dimensions. The provision of two different units merely divides the complete process into two successive steps. In other words, the first unit or group of teeth embodies the essentials of the cutter for the purposes of generic definition.

These cutters are mounted on rotatable cutter spindles designated as $c'$, $c^2$, etc. They are all at the same distance from the center of the work and their centers are spaced equally apart from one another on a circular arc or circumference concentric with the work spindle. Where the work piece is a complete gear, the cutter spindles are equally distributed in a complete circuit around the work; but for cutting gear segments the cutters need not occupy a complete circumference, and may be spaced at any convenient distance apart (properly correlated with the prescribed spacing of the teeth to be cut) without requiring the distance between them to be an integral divisor of 360° of arc. The absence of teeth from a sufficiently large fraction of the circumference of the cutters dispenses with the necessity of any radial depth feed.

The number of cutters and the number of teeth on each is determined by the diameter of the work piece and the number of teeth to be cut, but with a considerable range of variation. For example, six cutters with four teeth each, as here shown, can cut a maximum of twenty-four teeth in the work piece, but may also cut a smaller number of teeth. The present illustration shows them arranged to generate twenty-one teeth in a complete gear. When the number of teeth generated is less than the sum total of all the cutter teeth, the actions of the successive cutters overlap one another somewhat. Cutters of different pitch circle radius may be substituted for one another on the same spindles, or on a like number of spindles suitably spaced from the work spindle to accommodate such cutters without interference; and the number of cutter spindles may be anything within practical limits. That is, this number should not be so large as to require cutters of smaller diameter and lower diametral pitch than can be conveniently and efficiently made or satisfactorily used.

In general it may be said that the purposes of the invention are best carried out by providing as many cutters of approximately the smallest practicable pitch radius as can be accommodated in a circular series around the work piece without interfering with one another; since by so doing the number of teeth required to be generated by each cutter is reduced to the minimum and the production of the work expedited to that extent. But the invention is not limited in that respect, and may be embodied in conditions where the number of cutters is less than the maximum and the number of teeth in each unit is proportionally increased. By providing a suitable number of cutters at a suitable center distance from the work, with a proper number of teeth on each and proper adjustment of the cutters angularly on their respective spindles, gears can be cut with any number of teeth equally spaced around their pitch circumference even though the number of teeth is a prime number.

In the embodiment here described, the pitch circle spacing of the cutter teeth is equal to the pitch circle spacing of the teeth to be produced in the work, and the angular spacing of the cutters around the axis of the work, and the positions of the cutters on their respective spindles, are such as to locate the cuts made by the respective cutters at a distance apart equal to an integral multiple of the prescribed tooth spacing in the work. By "integral multiple" in this connection I mean the unit spacing multiplied by an integer greater than one. The cutters may be secured to their respective spindles with any angular adjustment. That is, they need not be adjusted so as to begin cutting all at the same instant, but may come into action successively in any sequence necessary to cut any given number of teeth with equal spacing. Thus, for instance, in the illustration shown, the cutters $b'$, $b^3$ and $b^5$ are located so as to begin cutting at the same instant and to locate corresponding cuts made by each at any given instant exactly 120° apart around the axis of the work. But the intermediate cutters $b^2$, $b^4$ and $b^6$ are adjusted with an angular displacement about their axes equal to the spacing of one tooth, relatively to the previously specified cutters, in order to be properly correlated for cutting twenty-one teeth. For cutting other numbers of teeth, the cutters may be otherwise adjusted; but in all cases they are so correlated that the teeth which each cutter generates are in uniform and equal spacing with the adjoining teeth produced by the adjacent cutters.

The necessary rolling motion between cutters and work for generating correct tooth forms may be obtained by rotating the cutters about their respective axes all at the same speed and in the same direction of angular rotation, for instance, that indicated by the arrows $d'$, $d^2$, $d^3$, etc., and simultaneously rotating the work about its axis in the opposite direction at the same peripheral speed; or by holding the work stationary and revolving the cutters bodily around the axis of the work in the direction of the arrow $f$, at a speed which causes them to roll with respect to the work in the manner of planet gears. In the illustration of Figs. 1 and 2 it is assumed that the work and cutters are rotated in fixed locations. Further on in this specification means are described whereby the cutters are both rotated and revolved.

The use of cutters with teeth occupying less than their full circumference eliminates necessity for any change of center distance between cutters and work for depth feed. This is because the large gap in the circumference of the cutters where there are no teeth permits placement of the work in pitch circle relationship with the cutters, or vice versa, when the blank sides of the cutters are turned toward the location of the work piece, without interference between the cutter teeth and the circumference of the work piece.

It will be understood from the foregoing explanation that relative rolling movement between the cutters and work sufficient to bring all of the teeth $t'$ (the teeth of a single cutter unit) of all the cutters into mesh with the work, in connection with a proper number of cutting strokes, suffices to generate all the teeth of the work piece; and the teeth so generated may be of finished dimensions, or over size, depending on the dimensions and proportions of the teeth $t'$. When two series of teeth, as those designated $t'$ and $t^2$ in the present illustration, are provided, the teeth of the second series or unit are brought into action by continuing the rolling movement through a sufficient additional angle. In so doing, the teeth $t^2$ of cutter $b'$ enlarge the spaces and reduce the width of the teeth of the work piece cut by the teeth $t'$ of cutter $b^2$; and each cutter thus performs a second cutting action on the teeth generated by the first cutting unit of the preceding cutter. But it is a matter of choice whether the complete cutting cycle is performed in one step or two or more steps. Generally a better finish is obtained by the plural step embodiment of the process, the teeth of the second or final unit being designed to take a light cut.

I have shown in Fig. 3 of the drawing, in a diagrammatic way, an apparatus by which the foregoing method may be performed. This apparatus embodies the principles of the means which I have devised for the purpose, together with further developments invented by E. W. Miller of Springfield, Vermont, in applying these principles to an organized commercial machine. Here the work piece *a* is mounted on an arbor 10 secured in a holder 11 which is stationary while the generating action takes place, and may be displaced for applying and removing the work. The cutter spindles are rotatably mounted in a cylindrical carrier 12 which is rotatable and movable endwise in a stationary bearing 13 coaxial with the work spindle axis. This carrier is reciprocated by a gear segment 14 which meshes with encircling rack teeth 15 on the circumference of the carrier and is oscillated at a suitable speed by mechanism not shown. The carrier 12 is rotated to carry the spindles in an orbit around the axis of the work, by a worm 16 meshing with a wide faced gear 17 which remains in mesh with the worm throughout the stroke of the carrier, and is rigidly secured to the carrier 12. This gear serves also as a thrust block acting through ball bearings 18 for propelling the cutters endwise in the cutting direction and withdrawing them. Rotation of the cutters about their individual axes at the proper speed is caused by a gear 19, normally held stationary, with which mesh gears 20 on the respective cutter spindles. The gears 20 slide lengthwise in mesh with gear 19 as the cutters are reciprocated, and the interengaging teeth of these gears guide the cutter teeth in their true paths necessary for shaping the teeth of the work. When helical teeth are to be generated, cutters are used of which the teeth are helical in the prescribed degree; and the gears 19 and 20 are helical gears of the same lead as the cutter teeth.

To effect backing off of the cutters sufficient to avoid rub on their return strokes, the spindles are formed with tapered portions 21 near the end on which the cutters are mounted, which fit complementally tapered bores in sleeves 22 which in turn have rotative bearing in a head 23 fitted in the adjacent end of the carrier 12 with provision for endwise movement relatively thereto, but in splined connection therewith to prevent independent rotation. Springs 24 react between the spindle carrier and head 23 tending to move the latter in the direction toward the cutters, and thus withdraw the tapered sleeve 22 from the tapered zones of the spindle. A rod 25, coaxial with the spindle carrier, is movable endwise both with and relatively to the carrier. It is equipped with a rack sleeve 26 meshing with a gear 27, which latter is rotated by suitable means when the cutters reach the end of their cutting strokes to move the rod 25 further in the same direction, thereby permitting springs 24 to free the tapered sleeve 22 from the tapered zones of the spindles. Springs 28 then push the spindles and cutters radially outward to the distance permitted by the displacement of the sleeve 22. The ball thrust bearings 18, being at a long distance from the cutters, permit such displacement of the cutters to the small extent which is sufficient for this purpose. When the spindles are clear of the work at the end of their return strokes, the gear 27 pulls the rod outward and thereby brings the tapered sleeves again into close engagement with the spindle, returning the cutters to cutting position. Elsewhere throughout the length of the spindles there is sufficient clearance between the spindles and carrier to permit this outward movement.

I am aware that the simultaneous generation of a number of gears by a single cutter is not new. For instance, the patent of Edward W. Miller, No. 1,990,240, dated February 5, 1935, shows the use of an interrupted cutter with a plurality of series of teeth of progressively larger dimensions to cooperate with work pieces carried by spindles in a planetary arrangement. And the patent to G. Fornaca, No. 1,604,984, November 2, 1926, shows three work spindles surrounding, and acted upon simultaneously by, a large cutter having a series of identical teeth occupying its entire circumference. But my method differs fundamentally from both of these patents in having a plurality of cutters all operating simultaneously on one gear, and each generating teeth in only a fractional part of the circumference of the gear. To the best of my knowledge and belief, this method is wholly new. It has a number of important advantages over the prior methods in that it permits the use not only of cutters of the dimensions long previously considered as standard, but cutters which have only a small fraction of the number of teeth ever heretofore used; an advantage from the point of view of cutter manufacturing cost. Then the size of gears which may be thus generated is practically unlimited, and cutters varying within only a small range of radial dimensions may be used to produce gears of any and all dimensions, in of course a small fraction of the time required to produce any such gear with a single cutter. Again, the rapidity of production due to multiple simultaneous action is obtainable with a cutting assemblage (work holder, cutter spindles and cooperating parts) of compact proportions.

What I claim and desire to secure by Letters Patent is:—

1. The method of generating gears which consists in providing a plurality of gear shaper cutters around the circumference of the work piece, in all of which the teeth are equally and uniformly spaced, locating the cutters to act simultaneously at points spaced apart on such circumference by an integral multiple of the prescribed tooth spacing, and effecting simultaneous relative cutting reciprocation and rolling motion between the cutters and work piece until the teeth generated by the several cutters, each in a limited sector of the work piece, form a continuous series of teeth.

2. The method of generating gears which consists in cutting teeth simultaneously in different portions of the circumference of a single work piece by gear shaper cutters all of which have teeth like one another in form and spacing and which are so correlated to one another and to the work that the cuts simultaneously made by corresponding teeth of the respective cutters are spaced apart on the circumference of the work piece by a distance equal to the prescribed tooth spacing of the work piece multiplied by an integer greater than one; and effecting relative cutting and rolling motions between the cutters and the work piece.

3. The method of gear generation which consists in operating simultaneously on a single gear blank by means of a plurality of cutters of the gear shaper type, each having a number of teeth sufficient to generate a fraction of the whole number of teeth to be cut in the work.

4. The method of gear generation which consists in providing a plurality of segmental gear shaper cutters equally spaced apart from one another in a circular arc concentric with the axis of the gear being cut, simultaneously effecting relative cutting traverse between said cutters and the work piece in the direction of the axes of the cutters, and simultaneously effecting relative rolling motion between the work piece and cutters through an angle sufficient to bring a subsequently acting tooth of a given cutter into the space cut by a precedently acting tooth of the next preceding cutter.

5. The method of gear generation which consists in simultaneously cutting and generating a plurality of teeth by individual cutters in different parts of the circumference of a workpiece, separated from one another by a distance greater than the prescribed tooth spacing, and continuing the tooth generation until intermediate teeth are made, forming with those first cut a complete uninterrupted series of teeth.

6. The method of gear generation which consists in providing a number of gear shaper cutters in a planetary arrangement around a single work piece, effecting relative axial reciprocating movements between the work piece and all of said cutters in unison, correlating the cutters with one another so that the grooves cut by each are at a distance apart from one another equal to a prescribed multiple of the spacing of the teeth to be generated in the work, and effecting relative angular movement about their respective axes of the cutters and work like that of gears rolling in mesh with one another.

7. The method of gear generation which consists in simultaneously cutting a fraction of the whole prescribed number of teeth by individual gear shaper cutters in different parts of the circumference of a workpiece, and continuing the tooth generation, with relative rolling motion between the cutters and work, until a subsequently acting tooth of each cutter enters the tooth space generated by the first acting tooth of the next preceding cutter.

8. The method of gear generation which consists in providing a number of gear shaper cutters each having teeth equally spaced throughout a fraction only of its circumference and substantially identical with corresponding teeth of the other cutters, placing said cutters at equal center distances from a gear blank in circular series around the axis of the blank, adjusting the cutters about their respective axes so that their toothless sides are next to the blank and so that their respective first cuts made in the generating action will be spaced apart on the circumference of the blank by an integral multiple of the predetermined tooth spacing, and effecting simultaneous axial reciprocative cutting movements and relative rolling movements like those of gears running in mesh between the blank and all of the cutters.

9. The method of gear generation which comprises locating a series of cutters with equal angular spacing around a gear blank at equal center distances from the axis of the blank, such cutters having radial teeth with cuting edges at one end, the circular pitch of which is equal to the circular pitch of the teeth designed to be generated, and the number of which on each cutter is at least as great as the number of teeth required to be cut in the sector of the work bounded by the radii of the blank on which the centers of such cutter and of the next adjacent cutter respectively are located, adjusting the cutters about their respective axes so that the first tooth of each to come into cutting action will incise the blank at a point distant from the cut made by the first acting tooth of the next adjacent cutter equal to an integral multiple of the prescribed tooth spacing, effecting a relative motion of axial reciprocation between the blank and cutters for cutting the work with a shaping action, and simultaneously effecting relative rotation between the cutters and blank about their respective axes in the manner of gears running in mesh together.

10. The method of gear generation which comprises mounting a plurality of cutting tools around the axis of a gear blank in position to cut simultaneously at different points in the circumference of the blank and with an angular spacing from one another greater than the angular spacing of the teeth to be cut, effecting repeated relative movements between the gear blank and all of the tools lengthwise of said axis first in one direction and then in the opposite direction to such extent that grooves are cut in the blank from one end toward the other by the tools, and effecting relative lateral movements between the blank and tools at such a slow rate with respect to the rate of said lengthwise movements as to cause each tool in the course of a multiplicity of said lengthwise movements to cut a plurality of grooves and to shape the material between such grooves into gear teeth of predetermined outline.

11. The method of spur and helical gear generation which consists in simultaneously cutting grooves in different sides of a cylindrical gear blank separated from one another by an angular spacing greater than that prescribed between adjacent finished teeth of the gear to be cut, throughout the length of the blank, thereafter simultaneously cutting other grooves one after another in sectors of the gear blank between the grooves first cut.

12. The method of gear generation which consists in cutting a number of grooves simultaneously in different sides of a gear blank by a like number of different tools spaced equidistantly from the geometrical axis of such blank and angularly around such axis with a spacing greater than the prescribed angular spacing of the teeth to be cut, progressively cutting other grooves by each tool simultaneously in different sectors of the blank between the grooves first cut, and causing the several tools each to generate to final finished dimensions and outlines, as tooth spaces conjugate to the teeth of a mating gear, the grooves cut previously by another tool.

13. A gear generating apparatus comprising a series of cutter spindles supported in circular arrangement about, and with their axes parallel to and equidistant from, a central axial line, a work holder having means for supporting a gear blank with the center of its rim in which teeth are to be cut coincident with said central line, means for effecting relative rotation between the work holder and cutter spindles simultaneously around said central line and the axes of the several spindles, and means for effecting relative reciprocating movements between the work holder and cutter spindles in the direction of said central line.

14. A gear generating apparatus comprising a plurality of cutters each having peripheral teeth of similar outline to gear teeth extending through less than its entire circumference, means for supporting said cutters equidistanly spaced from a central point with their toothless sides facing toward such point, a work holder having means for mounting a gear blank with its axis in coincidence with said central point, means for effecting relative reciprocation between the work holder and all the cutters lengthwise of such axis, and means for relatively rotating the cutters and work holder around said axis and simultaneously rotating the several cutters around their own axes.

15. A gear generating apparatus comprising a plurality of cutters each having peripheral teeth of similar outline to gear teeth extending through less than its entire circumference, means for supporting said cutters equidistantly spaced from a central point with their toothless sides facing toward such point, a work holder having means for mounting a gear blank with its axis in coincidence with said central point, means for revolving the cutters around said axis and simultaneously rotating them individually around their own axes, and means for effecting relative reciprocation between the cutters and work holder in the direction of said axis.

16. A gear generating apparatus comprising a plurality of cutters each having peripheral teeth of similar outline to gear teeth extending through less than its entire circumference, means for supporting said cutters equidistantly spaced from a central point with their toothless sides facing toward such point, a work holder having means for mounting a gear blank with its axis in coincidence with said central point, means for revolving the cutters around said axis and simultaneously rotating them individually around their own axes, and means for reciprocating the cutters relatively to the work piece in paths such that their teeth are caused to generate teeth in the work piece.

17. A gear generating apparatus comprising a rotatable and axially reciprocable cutter spindle carrier, a plurality of spindles rotatably mounted in said carrier equidistant from the axis of rotation thereof, a work holder having means for holding a gear blank in alinement with said axis, means for rotating said spindle carrier and simultaneously rotating the spindles about their respective axes, and means for reciprocating the spindle carrier.

18. A gear generating apparatus comprising a rotatable and axially reciprocable cutter spindle carrier, a plurality of spindles rotatably mounted in said carrier equidistant from the axis of rotation thereof, each protruding at one end from one and the same end of the carrier, a work holder having means for holding a gear blank adjacent to the end of the carrier from which the spindles protrude and in axial alinement with said axis, cutters mounted on the protruding ends of the spindles in a location to be carried back and forth by reciprocation of the carrier across the rim of a gear blank so located, means for reciprocating the carrier, and means for rotating the carrier and simultaneously rotating the spindles about their own axes.

19. A gear generating apparatus comprising a rotatable and axially reciprocable cutter spindle carrier, a plurality of spindles rotatably mounted in said carrier equidistant from the axis of rotation thereof, each protruding at one end from one and the same end of the carrier, cutters mounted on the protruding ends of the spindles, each having peripheral teeth of outline similar to gear teeth throughout a fraction only of their peripheries, a work holder having means for holding a gear blank with its rim in a location between the limit of reciprocation of the cutters and within the orbit of the cutters, means for reciprocating the carrier, and means for rotating the carrier about said axis and simultaneously rotating the spindles about their respective axes.

20. A gear generating apparatus comprising a rotatable and axially reciprocable cutter spindle carrier, a plurality of spindles rotatably mounted in said carrier equidistant from the axis of rotation thereof, each protruding at one end from one and the same end of the carrier, cutters mounted on the protruding ends of the spindles, each having peripheral teeth of outline similar to gear teeth throughout a fraction only of their peripheries connected to their respective spindles so that, in one position of the assemblage, the toothless sectors of all face toward said axis, a work holder having means for holding a gear blank with its rim in a location between the limits of reciprocation of the cutters and within the orbit of the cutters, means for reciprocating the carrier, and means for rotating the carrier about said axis and simultaneously rotating the spindles about their respective axes.

EVERARD STUBBS.